United States Patent [19]
Forstmeyer

[11] 3,775,664
[45] Nov. 27, 1973

[54] CONTROL CIRCUIT FOR A HIGH VOLTAGE POWER SUPPLY UTILIZING A RECTIFIER CASCADE

[75] Inventor: Udo Forstmeyer, Munich, Germany

[73] Assignee: Siemens Aktiengesellschaft, Berlin, Germany

[22] Filed: Jan. 18, 1973

[21] Appl. No.: 324,747

[30] Foreign Application Priority Data
Feb. 21, 1972 Germany.................. P 22 08 079.1

[52] U.S. Cl.................. 321/18, 321/15, 323/22 T, 323/22 Z, 330/69
[51] Int. Cl........................... G05f 1/12, H02m 7/24
[58] Field of Search ................. 321/15, 18; 323/17, 323/22 T; 330/69, 30 D

[56] References Cited
UNITED STATES PATENTS
3,477,011  11/1969  Westwood ........................... 321/15
3,533,010  10/1970  Bowles ............................... 321/15 X Primary Examiner—Gerald Goldberg
Attorney—Benjamin H. Sherman et al.

[57] ABSTRACT

A high voltage power supply unit employs a control circuit for controlling the output voltage provided by way of a rectifier cascade. A highly ohmic resistance and a potentiometer having a movable tap are serially connected between a tap of the rectifier cascade and ground. The movable tap is connected to a difference amplifier by way of an emitter follower circuit and the difference amplifier is connected to control a high voltage generator which feeds the rectifier cascade. A power stage, in the form of a Darlington circuit, is interposed between the difference amplifier and the high voltage generator to provide a sufficiently high load current supply for the high voltage generator.

1 Claim, 1 Drawing Figure

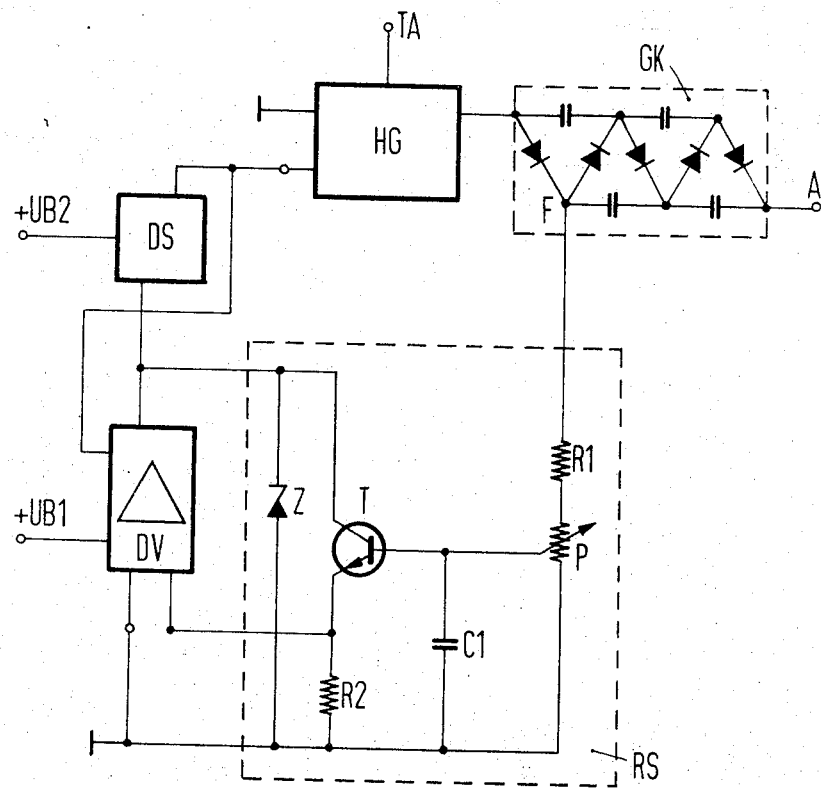

3,775,664

CONTROL CIRCUIT FOR A HIGH VOLTAGE POWER SUPPLY UTILIZING A RECTIFIER CASCADE

BACKGROUND OF THE INVENTION

1. Field of the Invention

This invention relates to a circuit arrangement for the control of the output voltage of a high voltage power supply unit, and more particularly to such a power supply unit wherein the output high voltage is created through a rectifier cascade.

2. Description of the Prior Art

It is generally known in the art to divide the output voltage, in the case of control power supply units, by means of a voltage divider and to feed only a portion of the output voltage as an actual value control quantity to the control circuit. In the case of high voltage power supply units having an output voltage in the order of 18 kV, this type of control faces considerable technical and economic difficulties. For example, the resistances for 18 kV are undesirably large and very expensive. Since the 18 kV output should not be loaded to much, a high ohmic voltage divider with a magnitude in the area of 1,000 MOhm must be used which, in addition, leads to an interference sensitive control circuit which easily tends to oscillate.

SUMMARY OF THE INVENTION

It is the object of this invention to provide a control circuit for controlling the output voltage of a high voltage power supply unit which uses a conventional rectifier cascade, a so-called Greinacher circuit, for the generation of high voltage, and which overcomes the disadvantages occurring in conventional power supply units.

According to the invention, the foregoing object is achieved through the use of a circuit arrangement which includes a voltage divider consisting of a high ohmic resistance and a potentiometer connected between a tap of the rectifier cascade and to ground. The connection to the rectifier cascade is preferably effected behind the first rectifier as viewed from the input of the rectifier cascade so that the tapped potential is considerably less than the output voltage. The potentiometer includes a movable contact which is connected, by way of an amplifier transistor for example, with an input of a difference amplifier of a low voltage power supply unit of conventional and generally known construction. A Zener diode is connected between the output of the difference amplifier and ground.

It is a special advantage of the invention that during a current discharge of the voltage divider, which is connected between the rectifier cascade and ground, the output voltage of the rectifier cascade is not over controlled by the control circuit, for example due to the failure of a resistance of the voltage divider, but is automatically maintained by the Zener diode at a fixed value.

BRIEF DESCRIPTION OF THE DRAWING

Other objects, features and advantages of the invention, its organization, construction and operation will be best understood from the following detailed description of a preferred embodiment of the invention taken in conjunction with the accompanying drawing, on which the single FIGURE is a schematic circuit representation of a high voltage power supply constructed in accordance with the principles of the present invention.

DESCRIPTION OF THE PREFERRED EMBODIMENT

In the drawing, an shown apart from the control circuit RS according to the invention, a known circuit arrangement for the creation of a high voltage including a rectifier cascade GK (Greinacher circuit) wherein the rectifier cascade is supplied by a high voltage pulse generator HG which has an input connected to a low voltage power supply unit consisting of a difference amplifier DV and a power stage DS.

For controlling the output voltage A of the rectifier cascade GK, the actual value control quantity could, as is the case in the conventional power supply unit, be directly diverted from the output voltage A. Since this technique, however, leads to the aforementioned technical and economic difficulties due to the voltage A being in the order of 18 kV, the actual value control quantity is, according to the invention, derived from a circuit point of the rectifier cascade GK. This actual value control quantity is considerably less than the output voltage A and follows the output voltage A with a high degree of accuracy. A voltage divider consisting of a resistor R1 and a potentiometer P is connected to a point F after the first rectifier within the rectifier cascade GK, the point F being particularly favorable according to the aforementioned requirements. By connecting the high ohmic resistance R1 to point F, an actual value control quantity which is reduced to a relatively small voltage value is available and is divided to a value representative of the output voltage A at the movable tap of the potentiometer P. The voltage at the movable tap of the potentiometer P could now serve directly as an input quantity for the difference amplifier DV and therefore serve as a control voltage for controlling the input voltage to the rectifier cascade GK by way of the power stage DS and the high voltage pulse generator HG. Since, however, the difference amplifier DV accepts a different current in case of a different input voltage, this would lead to an imperfect representation of the output voltage at the movable tap of the potentiometer P. For this reason, an impedance transformer in the form of an emitter follower comprising a transistor T and a resistor R2 is connected between the input of the difference amplifier DV and the movable tap of the potentiometer P so that the potentiometer P on the one hand has a very high resistance load and on the other hand the difference amplifier DV disposes of a sufficiently high load at the emitter of the transistor T. The collector of the transistor T is connected to the output of the difference amplifier DV and, consequently, the transistor T is fed by the battery voltage +UB1 of the difference amplifier DV. The desired value of the output voltage A, i.e. the quoted 18 kV in this example, is adjusted by way of the potentiometer P. The second input of the difference amplifier DV, which is connected to ground, is positively biased, in a well known manner not illustrated in the drawing, so that in case of a voltage increase at the output A exceeding the desired voltage (18 kV) changes the difference voltage at the input of the amplifier DV and thus the feed voltage of the rectifier cascade GK is decreased by way of the power stage DS and the high voltage pulse generator HG. In case of an output voltage which is to low, the same is increased by means of the control circuit RS in the same manner.

However, the occasion might arise wherein an imperfection in the voltage divider, for example an imperfection in the resistor R1, an imperfect solder joint or the break of a conductor, so that the current is interrupted in the voltage divider and that consequently the difference voltage at the input of the amplifier DV becomes insufficiently large over a longer time. In this case, the output voltage would be strongly over controlled. In order to avoid this situation, a Zener diode is connected between the output of the difference amplifier DV and ground to limit the output voltage of the difference amplifier DV to, in this example, 19 volt and therefore limit the voltage A to 20 kV.

Since the output of the difference amplifier DV can only be loaded very slightly, a power stage DS, for example in the form of a Darlington circuit, is connected thereafter so that the high voltage pulse generator HG is provided with a sufficiently high load current supply. The generator HG inductively creates, in connection with input pulses PA, high voltage output pulses which feed the rectifier cascade GK.

For increasing the initial voltage constant, as is illustrated in the drawing, the low voltage power supply unit consisting of the difference amplifier DV and the subsequently connected power stage DS, is supplied by two voltage sources +UB1 and +UB2 having varying internal resistances. Therefore, the current supply of the two transistors of the difference amplifier DV takes place once directly by way of the voltage source +UB1 and at another time by way of the power stage DS by the voltage source +UB2. A capacitor C1 is connected between the movable tap of the potentiometer P and ground for smoothing of the control quantity which is tapped at the potentiometer.

The circuit according to the present invention is not limited to the particular exemplary embodiment disclosed herein. The creation of the supply voltage for the rectifier cascade GK and thus also the influencing of the control quantity which can be tapped at the potentiometer P can be varied for the supply voltage.

Other changes and modifications of the invention may become apparent to those skilled in the art without departing from the spirit and scope of the invention and I therefore intend to include within the patent warranted hereon all such changes and modifications as may reasonably and properly be included within the scope of my contribution to the art.

I claim:

1. A circuit arrangement for the control of the output voltage of a high voltage power supply unit which has an output circuit including a rectifier cascade, comprising a voltage divider including a high ohmic resistor and a potentiometer connected in series with said resistor, said resistor connected to a point in said rectifier cascade and said potentiometer connected to a reference potential to provide a low voltage representation of the high output voltage of the rectifier cascade, said potentiometer including a movable tap, an amplifier having an input connected to said movable tap and an output, a difference amplifier having a first input connected to the reference potential, a second input connected to said output of said amplifier, and an output connected to the power supply unit for feeding a control signal thereto, and a Zener diode connected between the output of said difference amplifier and the reference potential to limit the control of the power supply unit by the output of said difference amplifier.

* * * * *